United States Patent Office 3,516,944
Patented June 23, 1970

---

3,516,944
CARBON NITROGEN BACKBONE CHAIN COPOLYMERS AS GELLING AGENTS
Morton H. Litt, Morristown, and Sorrell Roth, Irvington, N.J., assignors to Allied Chemical Corporation, New York, N.Y., a corporation of New York
No Drawing. Filed Jan. 4, 1967, Ser. No. 607,152
Int. Cl. B01j *13/00;* C10l *7/00;* A23d *3/00*
U.S. Cl. 252—316    9 Claims

ABSTRACT OF THE DISCLOSURE

Combinations of 2-substituted-oxazolines and dihydro oxazine copolymers with a polar liquid such as water, ethylene or propylene glycol or ethanolamine are gelling agents for nonpolar organic liquids and low melting solids.

---

This invention relates to novel gels produced by admixing non-polar organic liquids and low melting solids with an oxazoline or oxazine copolymer and a polar liquid.

These gels are useful in the preparation of a wide variety of materials as, for example, paint removers, gelled jet fuels, carriers for medicaments, lubricating greases, margarine, and napalm type incendiaries.

It is a primary object of this invention to provide novel gels comprising a non-polar organic component, a polar component, and an oxazine or oxazoline copolymer. It is a further object of this invention to provide a novel process for the production of such gels.

It has been found in accordance with this invention that combinations of certain 2-substituted-Δ2-oxazoline and 2-substituted-5,6-dihydro-4H-1,3-oxazine copolymers with a polar liquid such as water, ethylene glycol, propylene glycol, ethanolamine or mixtures thereof are effective gelling agents for a wide variety of non-polar organic liquids and low melting solids.

Accordingly this invention contemplates novel gel compositions produced by dispersing a mixture of a polymer obtained by copolymerizing monomeric compounds of the formula

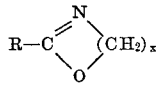

(I)

wherein R is a substituent selected from the group consisting of $CH_3$—, $C_2H_5$—, $$C_nH_{2n+1}-\overset{O}{\underset{\|}{C}}O(CH_2)_m-, \quad C_nH_{2n+1}-O\overset{O}{\underset{\|}{C}}-(CH_2)_m-, \quad -O\overset{O}{\underset{\|}{C}}(CH_2)_m-$$

and $HO(CH_2)_m$— wherein $m$ is 0 to 6 inclusive and wherein the sum of the integers $m$ and $n$ is not greater than 6 and wherein $x$ is 2 to 3; and a $C_5$ to $C_{21}$ alkyl or alkenyl substituted-Δ2-oxazoline or 5,6-dihydro-4H-1,3-oxazine; a polar liquid such as water, ethylene glycol, propylene glycol, or ethanol-amine or mixtures thereof; and a non-polar organic liquid or low melting solid, under such conditions of temperature and mixing induced shear that the components are uniformly and homogeneously distributed throughout the mixture. The term low melting as herein used connotes a liquefaction point below 150° C.

In carrying out the process of our invention the copolymer component of the gel is prepared in accordance with the process described in copending U.S. application No. 382,343. In essence, this process comprises polymerizing, under an inert atmosphere by means of a cationic catalyst, a mixture of monomers of the general structure:

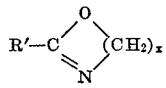

wherein R' is equivalent to R as hereinbefore defined for the major portion of the monomers, and is a $C_5$ to $C_{21}$ alkyl or alkenyl hydrocarbon radical for the minor portion of the monomers. The resultant copolymers are made up of recurring units of the formula:

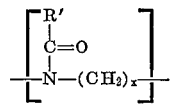

wherein R' and x are defined as above.

As has been disclosed, the gels of our invention contain three components: a copolymer as described above; a polar liquid selected from the group consisting of water, ethylene glycol, propylene glycol, and ethanolamine and mixtures thereof; and a non-polar organic liquid or low melting solid. The order of addition of the three components to each other is not critical to gel formation. The gels of our invention may be prepared by addition of the copolymer to a stirred mixture of the polar and non-polar component. It is also possible to form a gel by dissolving the copolymer in a solvent such as chloroform, adding this copolymer solution to thte non-polar component, and thereafter adding the polar liquid to the stirred dispersion of the copolymer in the nonpolar component.

In an alternative procedure, the non-polar organic liquid or low melting solid may be combined with a solution or dispersion of the copolymer in the polar liquid. If the copolymer is soluble in the polar component its dissolution therein may be achieved by any convenient means, as for example, by addition of the copolymer to the polar liquid followed by stirring and heating of the mixture until tthe copolymer is completely dissolved. If the copolymer is not soluble or is only partially soluble in the polar component, as is sometimes the case especially when the polar component is water, the copolymer may be dispersed in the polar liquid by first dissolving the copolymer in alcohol or other liquid in which the copolymer is soluble and with which the polar constituent is miscible and then mixing this copolymer solution with the polar component. This affords a dispersion of the polymer in swollen form in the polar component ready for interaction with the non-polar material to be gelled.

In the preferred embodiment of this invention preparation of the gel is effected by adding the non-polar organic material portion-wise to the aforementioned solution or dispersion of the copolymer in the polar component under such conditions of temperature and shear induced by mixing that the three components are homogeneously distributed throughout the mixture. Dispersion is enhanced by elevated temperature and high shear although the mixing may be carried out at temperatures ranging from below room temperature up to the boiling point of the lowest boiling gel component. When the non-polar component is a solid at room temperature the temperature at which mixing is carried out must be sufficiently high to liquify it in order to achieve a sufficient degree of dispersion.

In all cases, regardless of the order of addition, gelation of the entire mixture occurs spontaneously as soon as the mixture becomes sufficiently homogenized if the components are present in suitable proportions. If an inadequate quantity of copolymer is present there is a tendency to form an emulsion rather than a gel. If too much polar component relative to nonpolar is present, the tendency is to form a two phase system consisting of a gel phase plus a separate phase containing either the polar or in some cases part of the non-polar component depending on whether the polar or non-polar component forms the gel matrix. If too much non-polar component is present relative to the polar component a two phase system consisting of gel and excess non-polar component may be formed or the entire system may form a liquid emulsion.

A suitable ratio of copolymer to polar component for gel formation may range from about 0.02 to about 50 and preferably from about 1 to about 20 parts by weight of copolymer per 100 parts of polar component. The ratio chosen will depend upon the copolymer and polar component selected, upon the material to be gelled and upon the physical properties desired for the resultant gel. In general, increasing the ratio of copolymer to polar component leads to less deformable gels. The amount of non-polar component in the gel vary from about 20% to about 85% and a suitable proportion may be determined experimentally. It will vary with the desired physical properties of the gel and the other components thereof. In general, the higher the ratio of non-polar component to the other components, the greater the deformability of the resultant gel.

Suitable polar components for the gel are water, ethylene and propylene glycol, ethanolamine and mixtures thereof.

The types of materials which can be gelled are generally almost any non-polar organic liquid or low melting solid having limited or no solubility in the polar component of the gel. The term non-polar as herein used connotes a dielectric constant of less than about 20. Suitable non-polar materials include, for example, gasoline (a mixture of straight and branched-chain paraffins, naphthenes and aromatic hydrocarbons), kerosene, fuel and motor oil, white medicinal oil, 2,3-dimethylbutane, 2,2,4-trimethyl pentane, decalin, benzene, xylene, cumene, ortho dichlorobenzene, isoamyl alcohol, diethyl phthalate, butyl acetate, dichlorodifluoromethane, methyl isobutyl ketone, carbon tetrachloride, corn oil, soybean oil, paraffin wax, polyethylene wax and lard. Partially halogenated aliphatic hydrocarbons which can undergo strong hydrogen bonding, such as chloroform, do not gel satisfactorily.

The 2-methyl-2-oxazoline and 2-methyl-5,6-dihydro-4H - 1,3 - oxazine based copolymers of this invention which are suitable contain from about 3 to about 30 mole percent individual or mixed long chain oxazolines or oxazines. Long chain oxazoline or oxazine connotes a 5,6-dihydro-4H-1,3 - oxaine or 2-oxazoline substituted in the 2-position with a $C_5$ to $C_{21}$ aliphatic or alkenyl hydrocarbon side chain. Lower percentages of the long chain comonomer will be required when the average side chain length approaches $C_{21}$, higher percentages of comonomer will be required when the average side chain length approaches $C_5$.

The copolymers derived from monomers of the structure:

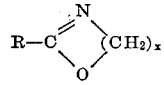

wherein R is a substituent selected from the group consisting of $C_2H_5-$,

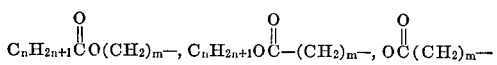

and $HO(CH_2)_m$ and wherein $m$, $n$, and $x$ are as hereinbefore defined, which are suitable contain from about 1 to about 30 mole percent individual or mixed long chain oxazolines or oxazines.

Suitable long side chain comonomers include but are not limited to 2-pentyl, 2-hexyl, 2-heptyl, 2-octyl, 2-undecyl, myristyl, stearyl, eicosyl, 2-dodecenyl, and 2-heptadecenyl-2-oxazoline and 5,6-dihydro-4H-1,3-oxazine and the like.

The preferred copolymers are those which have only a limited solubility in the non-polar gel constituent.

The following specific examples further illustrate our invention. Parts are by weight unless otherwise expressly noted.

EXAMPLE 1

633.2 grams (6.39 moles) of freshly distilled 2-ethyl-2-oxazoline, 83.5 g. (0.27 mole) of freshly distilled 2-(n-heptadecyl)-2-oxazoline (both of which had been maintained under an atmosphere of purified nitrogen), and 0.62 g. (0.00167 mole) of ethylene glycol-di-p-toluene sulfonate were added to a three-necked glass reactor fitted with a motor-driven stirrer, condenser, thermowell, and means for maintaining an atmosphere of purified nitrogen over the reaction mixture. The monomer-to-catalyst ratio was about 4000 to 1. The reaction mixture was brought up to a temperature of 151° C. with a heated oil bath over a period of 4¾ hours at which time it became too viscous to stir. Heating was then continued at 151° C. for about an additional 16 hours while maintaining the reaction mixture under a slow flow of purified nitrogen. It was then allowed to cool to room temperature when the reactor and contents were immersed in liquid nitrogen which cracked the glass away from the strongly adhering polymer. The chunks of polymer obtained were reduced to a small particle size by grinding with Dry Ice. Entrained carbon dioxide and moisture were removed from the ground product by treating in a vacuum oven at 57° C. under 15–30 mm. Hg for about 4 days. Total product recovered was 695.2 grams amounting to a yield of 97.0% of polymer containing 4.5 mole percent 2-(η-heptadecyl)-2-oxazoline and 95.5 mole percent 2-ethyl-2-oxazoline. Reduced viscosity of the polymer was 2.89 as determined with a 0.52% weight solution in m-cresol at 25° C.

100 cc. (73.5 g.) of regular grade automotive gasoline and (10 cc. (11.16 g.) of ethylene glycol were charged to a flask containing a stirring bar driven by a magnetic device. Then 1.5 grams of the above copolymer containing 4.5 mole percent 2-(η-heptadecyl)-2-oxazoline was added to the gasoline-glycol mixture with stirring. A gel formed taking up about 50 cc. of the gasoline. This was a soft mobile gel that was somewhat sticky but not stringy. Some stringiness appeared upon standing 2 days. Weight percent composition of the gel was about 3.0% copolymer, 22.6% ethylene glycol and 74.4% gasoline. After allowing the gel to stand about one month a spatula compression test showed it to be very elastic. According to this test, elasticity is determined qualitatively by forcing the flat surface of a spatula through the gel. When motion of the spatula is stopped, an elastic gel tends to force the spatula back out of the compressed area.

EXAMPLE 2

Three grams of the 2-(η-heptadecyl)-2-oxazoline/2-ethyl-2-oxazoline copolymer of Example 1 containing 4.5 mole percent 2-(η-heptadecyl)-2-oxazoline was dissolved in 10 cc. (11.16 g.) of ethylene glycol and 50 cc. (36.75 g.) of gasoline added in increments with stirring to the glycol solution. The product obtained was a more solid gel than that of Example 1. It was quite sticky and stringy and became tougher upon standing two days. Weight percent composition of the gel was about 5.9% copolymer, 21.9% ethylene glycol and 72.2% gasoline. After allowing the gel to stand about one month, a slight syneresis was noted and the spatula compression test showed it to be very elastic.

EXAMPLE 3

657 grams (6.63 moles) of 2-ethyl-2-oxazoline and 30.6 g. (0.099 mole) of 2 - (η-heptadecyl)-2-oxazoline were reacted in the presence of 0.610 g. (0.00165 mole) of ethylene glycol-di-p-toluene sulfonate as catalyst to produce a copolymer containing 1.5 mole percent 2-(η-heptadecyl)-2-oxazoline and 98.5 mole percent 2-ethyl-2-oxazoline. Monomer-to-catalyst ratio was 4080 to 1. Procedure used was essentially that of Example 1 with reaction times including a 4-hour period while increasing the temperature from room temperature to 134° C., followed by a 16-hour period at 134° C., then 24 hours at 151° C. The 684 g. of product thus obtained (99% yield) was processed into dry granulated product in a manner similar to that used in Example 1 to give 656.5 grams (95% yield) of copolymer having a reduced viscosity as determined in m-cresol of 2.4.

Five grams of the above copolymer containing 1.5 mole percent of 2-(η-heptadecyl)-2-oxazoline and 10 cc. (11.16 g.) of ethylene glycol were charged to a flask fitted with a magnetic stirrer and condenser and the mixture heated at a temperature of up to about 100° C. Gasoline was then added in increments to the hot glycol solution with vigorous stirring until 50 cc. (36.8 g.) had been added. The resultant mixture did not stir smoothly. Addition of 10 cc. (11.16 g.) of ethylene glycol permitted smooth mixing, and then an additional 50 cc. (36.8 g.) of gasoline was added which produced a gel containing 90 cc. (66.2 g.) of the gasoline added. The gel was mobile and non-stringy initially. Weight percent composition of the gel was 5.3% copolymer, 23.9% ethylene glycol and 70.8% gasoline. After allowing the gel to stand about a month the spatula compression test showed some elasticity.

EXAMPLE 4

A copolymer was prepared containing 6.1 mole percent 2-(η-heptadecyl)-2-oxazoline and 93.9 mole percent 2-ethyl-2-oxazoline. It was prepared by a procedure similar to that used in Example 1 with a monomer-to-catalyst (ethylene glycol-di-p-toluene sulfonate) ratio of 1640 to 1. The reduced viscosity was 0.6.

Three grams of the above copolymer containing 6.1 mole percent 2 - (η-heptadecyl)-2-oxazoline and 10 cc. (11.16 g.) of ethylene glycol were charged to a flask fitted with a magnetic stirrer and condenser and the mixture heated at a temperature of up to about 100° C. Gasoline was then added in increments to the hot glycol solution with vigorous stirring until 50 cc. (36.8 g.) had been added. The resultant mixture did not stir smoothly. Addition of 5 cc. (5.58 g.) of ethylene glycol permitted smooth mixing and gel formed which incorporated the 50 cc. of gasoline. The gel was soft, mobile and non-stringy. Weight percent composition of the gel was 5.3% copolymer, 29.6% ethylene glycol and 65.1% gasoline. After allowing the gel to stand about a month, it showed substantially no syneresis. It showed a great elasticity by the spatula compression test.

EXAMPLE 5

Twelve grams of the copolymer of Example 4 containing 6.1 mole percent of 2-(η-heptadecyl)-2-oxazoline and 93.9 mole percent of 2-ethyl-2-oxazoline and 60 cc. (66.9 g.) of ethylene glycol were charged to a flask fitted with a magnetic stirrer and condenser and solution effected by heating up to a temperature of about 100° C. The resultant hot glycol solution was then added to 200 cc. (147 g.) of gasoline in a flask fitted with a magnetic stirrer and condenser. The mixture was allowed to cool while stirring. A soft mobile gel was obtained upon cooling to room temperature and all the gasoline was absorbed. Weight percent composition of the gel was 5.3% copolymer, 29.6% ethylene glycol and 65.1% gasoline. The gel showed only a slight syneresis and had a great elasticity after standing about a month.

EXAMPLE 6

Ten grams of the copolymer of Example 4 was dissolved in 45 cc. (50.2 g.) of ethylene glycol and the hot solution added to 150 cc. (110.3 g.) of gasoline according to the procedure of Example 5. The resultant mixture was then heated at reflux with stirring. Gel formation began after 40 minutes and all of the gasoline was absorbed to give a complete gel after two hours. The gel was soft, sticky and mobile. It was quite stable and showed no syneresis after standing one month. The spatula compression test showed great elasticity. Weight percent composition of the gel was 5.9% copolymer, 29.4% ethylene glycol and 64.7% gasoline.

The elasticity and consistency of this gel was characterized further by evaluation with a CWS Torsiometer, an instrument manufactured by the Koehler Instrument Company, Jamaica, N.Y. Use of this instrument in determining the elasticity and consistency of gels is described in J. Physical and Colloid Chem., 52 (9), 1460–1470 (1948). The method consists essentially of rotating a test paddle inserted into a gel through a turn of 360° C. with a known driving force and releasing the turning force at this point permitting the paddle to return toward the original position. The extent of return is a measure of elasticity. The average time required to rotate through 360° C. is a measure of the consistency. Means are provided for measuring the degrees of rotation of the paddle which consist of an indicator pointer and a disk calibrated in degrees mounted on the top portion of the paddle, together with a driving pulley. The subject gel had a 55° return (elasticity) and a 15 second 360 degree rotation time (consistency). The values fall within the requirements for napalm type gels.

The viscosity behavior under shear stress of the above gel was determined with a Ferranti-Shirley Cone-Plate Viscometer. This instrument is described in "Viscosity and Flow Measurement," pp. 112–129 (1963), Interscience Publishers. The following results obtained with a Ferranti medium cone at 77° F.±1° F. show shear thinning under stress:

| Shear rate, sec.$^{-1}$ | Apparent viscosity, poise | Poise, sec. |
|---|---|---|
| 3.02 | 3,140 | 1,040 |
| 3.39 | 3,100 | 914 |
| 5.55 | 2,700 | 486 |
| 6.9 | 2,570 | 372 |
| 7.1 | 2,830 | 399 |
| 7.5 | 2,750 | 367 |
| 9.6 | 2,480 | 258 |
| 11.3 | 2,350 | 208 |
| 19.8 | 1,650 | 83 |

EXAMPLE 7

A gel was prepared having a weight percent composition of about 9.0% of the copolymer of Example 1, 23% ethylene glycol and 68% gasoline. The warmed gasoline was added to the warm glycol solution with vigorous stirring and the mixture allowed to cool while stirring was continued. A single phase gel resulted upon cooling to room temperature. This gel showed no syneresis after standing a month and the spatula compression test showed great elasticity. Evaluation with the CWS Torsiometer showed a 62° return (elasticity and a 22 second 360 degree rotation time (consistency). These values are within the requirements for napalm type gels.

Viscosity behavior by the Ferranti-Shirley Cone-Plate method showing shear thinning under stress was as follows:

| Shear rate, sec.$^{-1}$ | Apparent viscosity, poise | Poise, sec. |
|---|---|---|
| 3.3 | 5,600 | 1,697 |
| 3.47 | 5,000 | 1,441 |
| 5.33 | 3,960 | 743 |
| 7.07 | 3,090 | 437 |
| 8.73 | 2,570 | 294 |
| 10.9 | 1,970 | 181 |
| 19.0 | 1,270 | 67 |

EXAMPLE 8

657 grams (6.63 moles) of 2-ethyl-2-oxazoline and 30.6 grams (0.099 mole) of 2-(η-heptadecyl)-2-oxazoline were reacted in the presence of 0.610 gram (0.00165 mole) of ethylene glycol-di-p-toluene sulfonate as catalyst to produce a copolymer containing 1.5 mole percent 2-(η-heptadecyl)-2-oxazoline and 98.5 mole percent 2-ethyl-2- oxazoline. Monomer-to-catalyst ratio was 4080 to 1. The reaction time included a 4-hour period while increasing the temperature to 134° C., followed by a 16-hour period at 134° C., then 24 hours at 151° C. The 684 grams of product thus obtained (99% yield) was processed into dry granulated product by grinding with Dry Ice and then treating in a vacuum oven at about 57° C. under 15–30 mm. Hg for about 4 days. 656.5 grams (95% yield) of copolymer having a reduced viscosity of 2.4 as determined with a 0.52 weight percent solution in m-cresol at 25° C. was obtained.

Two grams of the above copolymer was dissolved in 20 cc. of ethanol. Then one cc. of this solution, 10 cc. of water and 15 cc. of motor grade gasoline were placed in a 20 mm.×150 mm. test tube, the test tube shaken vigorously by hand and allowed to stand. The water phase separated leaving the gasoline phase as a gel containing about 2 cc. of water. Weight percent composition of the gel was approximately 1.8% copolymer, 15.0% water and 83.2% gasoline.

EXAMPLE 9

Copolymers of 2-ethyl-2-oxazoline and 2-($\eta$-heptadecyl)-2-oxazoline containing 1.02, 1.35, 3.00, 3.49 and 6.85 mole percent of the latter and having reduced viscosities of 4.46, 3.14, 1.23, 1.07, and 2.17, respectively, were evaluated as gelation agents for gasoline in test tube tests. These were carried out by adding 10 cc. of water and 10 cc. of gasoline to about 0.05 grams of copolymer dissolved in about 1 cc. of ethanol, then shaking the mixture vigorously for a minute and allowing it to stand. The water phase separated leaving the gasoline phase as a gel retaining about 20% of the water in the tests with the copolymers containing 1.02, 1.35, and 3.0 mole percent of the 2-($\eta$-heptadecyl)-2-oxazoline. The copolymers of higher concentrations of 3.49 and 6.85 mole percent did not produce gels. Weight percent compositions of the gels was about 0.5% copolymer, 21.3% water and 78.2% gasoline. The gel containing the 3.0 mole percent of the 2-($\eta$-heptadecyl)-2-oxazoline was readily ignited upon application of a flame.

EXAMPLE 10

A series of 2-methyl-2-oxazoline and 2-($\eta$-heptadecyl)-2-oxazoline copolymers containing from 0.93 to 13.0 mole percent of the latter were evaluated as gelation agents for gasoline according to the test tube procedure of Example 9. Typical copolymers were those prepared containing 4.94 and 10.57 mole percent of the 2-($\eta$-heptadecyl)-2-oxazoline obtained by copolymerizing the monomers in butyrolactone solvent for 24 hours at 150° C. with hexamethylene glycol-di-p-toluene sulfonate as catalyst at monomer-to-catalyst ratios of 1210 to 1 and 1340 to 1 respectively. Gel tests results were as follows.

| 2-methyl-2-oxazoline (mole percent) | 2-($\eta$-heptadecyl)-2-oxazoline (mole percent) | Reduced viscosity | Gel formation |
|---|---|---|---|
| 99.07 | 0.93 | 0.96 | No |
| 97.03 | 2.97 | 0.88 | Yes |
| 95.06 | 4.94 | | Yes |
| 89.43 | 10.57 | | Yes |
| 86.87 | 13.2 | 0.81 | Yes |

Weight percent composition of the above gels was about 0.5% copolymer, 21.3% water and 78.2% gasoline.

EXAMPLE 11

(A) 204 grams (2.50 moles) of 2-methyl-2-oxazoline was dissolved in 167 g. of $\gamma$-butyrolactone and 1.90 grams (0.00674 mole) of 2-(p-chlorophenyl)-$\Delta$2-oxazolonium perchlorate added so that the monomer-to-catalyst mole ratio was 3710 to 1. The mixture was then heated in a sealed tube up to 130° C. over a period of about 5 hours and heating continued for 16 hours at 130° C. The product was purified by treatment with benzene and diethyl ether and dried. The reduced viscosity was 0.74.

(B) 3.0 grams (0.03 mole) of 2-ethyl-2-oxazoline was added to 1.0 ml. of an acetonitrile solution containing 0.0000123 mole of methylene-p-toluene sulfonate giving a monomer-to-catalyst mole ratio of 2460 to 1. The acetonitrile was stripped off under reduced pressure and the mixture was polymerized at 130° C. for 18 hours and then at 150° C. for 6 hours. The purified and dried product had a reduced viscosity of 3.05.

The above polymers and copolymers of 2-methyl-2-oxazoline and 2-ethyl-2-oxazoline with 2-($\eta$-heptadecyl)-2-oxazoline were used in gelation tests with kerosene using the test tube procedure of Example 9. Results were as follows.

| 2-methyl-2-oxazoline (mole percent) | 2-($\eta$-heptadecyl)-2-oxazoline (mole percent) | Reduced viscosity | Gel formation |
|---|---|---|---|
| 100 | 0 | 0.74 | No |
| 99.07 | 0.93 | 0.96 | No |
| 97.03 | 2.97 | 0.88 | Yes |
| 93.00 | 7.00 | 0.91 | Yes |

| 2-ethyl-2-oxazoline (mole percent) | 2-($\eta$-heptadecyl)-2-oxazoline (mole percent) | Reduced viscosity | Gel formation |
|---|---|---|---|
| 100 | 0 | 3.05 | No |
| 98.98 | 1.02 | 4.46 | Yes |
| 98.65 | 1.35 | 3.14 | Yes |
| 97.00 | 3.00 | 1.23 | Yes |
| 96.51 | 3.49 | 1.07 | No |
| 93.15 | 6.58 | 2.17 | No |

Weight percent composition of the above gels was about 0.4% copolymer, 19.6% water and 80% kerosene.

EXAMPLE 12

Polymers of 2-methyl-2-oxazoline and 2-ethyl-2-oxazoline and their copolymers with 2-($\eta$-heptadecyl)2-oxazoline were evaluated as gelation agents for mineral oil and corn oil according to the test tube procedure of Example 2, with the following results:

| 2-ethyl-2-oxazoline (mole percent) | 2-($\eta$-heptadecyl)-2-oxazoline (mole percent) | Reduced viscosity | Gel formation Mineral oil | Gel formation Corn oil |
|---|---|---|---|---|
| 100.00 | 0 | 3.05 | No | No |
| 98.98 | 1.02 | 4.46 | Yes | Yes |
| 98.65 | 1.35 | 3.14 | Yes | Yes |
| 97.93 | 2.08 | 0.96 | Yes | Yes |
| 97.52 | 2.48 | 1.11 | Yes | Yes |
| 97.00 | 3.0 | 1.23 | Yes | Yes |
| 96.51 | 3.49 | 1.07 | Yes | Yes |
| 93.15 | 6.58 | 2.17 | No | No |
| 89.05 | 10.95 | 2.17 | No | No |

| 2-methyl-2-oxazoline (mole percent) | 2-($\eta$-heptadecyl)-2-oxazoline (mole percent) | Reduced viscosity | Gel formation Mineral oil | Gel formation Corn oil |
|---|---|---|---|---|
| 100.00 | 0 | 0.74 | No | No |
| 99.07 | 0.93 | 1.07 | No | No |
| 97.03 | 2.97 | 0.88 | Yes | Yes |
| 95.06 | 4.94 | | Yes | Yes |
| 93.00 | 7.00 | 0.91 | Yes | Yes |
| 89.43 | 10.57 | | Yes | Yes |
| 87.00 | 13.00 | | Yes | Yes |

Weight percent composition of the above gels was about 0.5% copolymer, 18.5% water and 81% oil. The mineral oil used was a highly refined, clear, water-white oil.

EXAMPLE 13

9.4775 grams (0.0956 mole) of 2-ethyl-2-oxazoline and 0.9154 grams (0.00296 mole) of 2-$\eta$-heptadecyl)-2-oxazoline were reacted together for 24 hours at 130° C. in the presence of a 2000 to 1 monomer-to-catalyst ratio using 2-(p-chlorophenyl)-2-oxazolonium perchlorate as catalyst. The copolymer obtained contained 3.0 mole percent of 2-($\eta$-heptadecyl)-2-oxazoline and had a reduced viscosity of 1.23.

A test tube gelation test with the above copolymer was carried out in the same manner as in Example 2 using cumene. The organic phase separated as a gel of weight percent composition of about 0.5% copolymer, 18.8% water and 80.8% cumene. Similar results were obtained using xylene.

EXAMPLE 14

Copolymers of 2-ethyl-2-oxazoline with 2-($\eta$-heptadecyl)-2-oxazoline containing 1.35 and 3.0 mole percent of the latter were evaluated as gelling agents for methylene chloride, ethyl acetate, butyl acetate, methyl ethyl ketone and methyl isobutyl ketone in the water system according to the procedure of Example 9. Gels were not obtained with methylene chloride, ethyl acetate and methyl ethyl ketone. The butyl acetate gelled at both the 1.35 and 3.0 mole percent concentrations of 2-($\eta$-heptadecyl)-2-oxazoline. Methyl isobutyl ketone gelled at the 3.0% level.

EXAMPLE 15

A copolymer containing 95 mole percent 2-ethyl-2-oxazoline and 5 mole percent 2-($\eta$-undecyl)-2-oxazoline was also evaluated as a gelling agent in a similar manner using 0.1–0.2 gram of the copolymer for 10 cc. of organic phase. Dimethyl butane, benzene, mineral oil and carbon tetrachloride were gelled. Ethyl acetate and chloroform were not.

EXAMPLE 16

A series of experiments was carried out using ethyl/heptyl and ethyl/undecyl oxazoline copolymers. To about 0.1 gram of copolymer dissolved in 0.5 cc. of ethanol was added, 10 ml. of water and 10 ml. of the non-polar organic component. The mixture was vigorously shaken for 1 minute and then allowed to stand for 30 minutes before examination for gel formation. Results are tabulated below.

| Organic component | Ethyl/heptyl, mole percent heptyl | | Ethyl/undecyl, mole percent undecyl | | |
|---|---|---|---|---|---|
| | 10 | 20 | 3.1 | 5.0 | 20 |
| Corn oil | + | + | + | + | 0 |
| Mineral oil | 0 | + | + | + | 0 |
| Gasoline | 0 | 0 | + | + | 0 |
| Benzene | + | 0 | + | + | 0 |
| Decalin | 0 | 0 | + | + | 0 |
| Iso-amyl alcohol | + | 0 | 0 | 0 | 0 |
| n-Butyl benzoate | + | + | + | + | 0 |
| Diethyl phthalate | + | + | 0 | + | 0 |
| Butyl acetate | 0 | 0 | + | 0 | 0 |
| o-Dichlorobenzene | + | + | + | + | 0 |
| Carbon tetrachloride | + | + | + | + | 0 |
| 2,2,4-trimethyl pentane | + | 0 | + | 0 | 0 |
| Genetron 11 (trichloromonofluoromethane) | 0 | 0 | 0 | + | 0 |
| Genetron 114/12 (mixed dichlorodifluoromethane-dichlorotetrafluoroethane) | 0 | 0 | 0 | + | 0 |
| 2,3-dimethyl butane | 0 | 0 | 0 | + | 0 |

0=No gel formation.
+=Gel formation.

EXAMPLE 17

To establish the lower limit of copolymer capable of causing gel formation, a series of gels was prepared using corn oil as the organic phase and a 95/5 $C_2/C_{11}$ oxazoline copolymer. A standard solution of copolymer in ethanol was progressively diluted and mixed with water and corn oil according to the procedure of Example 16. The lowest concentration of polymer capable of causing gelation was 0.02 wt. percent. A mixture containing 0.01% polymer emulsified but did not gel.

EXAMPLE 18

Gels were prepared using the mixture procedure of Example 16 using a single level of copolymer concentration in all cases (0.5 wt. percent based on the organic phase). The purpose of this experiment was to ascertain the composition range of methyl/heptadecyl and ethyl/heptadecyl copolymers which were capable of causing gel formation. (Table 1.)

EXAMPLE 19

The following gels were prepared using ethylene glycol as the polar phase and the indicated organic liquids as the non-polar constituent.

| | Copolymer | |
|---|---|---|
| Non-polar component | 95/5 $C_2/C_{11}$ oxazoline | 95.9/4.1 $C_2/C_{17}$ oxazoline |
| Butyl acetate | + | + |
| Benzene | + | + |
| Methyl isobutyl ketone | + | + |
| Isoamyl alcohol | − | − |
| Carbon tetrachloride | + | + |
| Pump oil | + | + |
| 2,3-dimethyl butane | + | + |
| Hexane | + | + |

+=Gel formation.
−=No gel formation.

TABLE I

| Organic component | Ethyl/heptadecyl oxazoline copolymers, mole percent heptadecyl | | | | | | | | Methyl/heptadecyl oxazoline copolymer, mole percent heptadecyl | | | | | |
|---|---|---|---|---|---|---|---|---|---|---|---|---|---|---|
| | 0 | 1.0 | 1.35 | 2.0 | 2.5 | 3.0 | 3.5 | 6.8 | 0 | 1.0 | 3.0 | 5.0 | 7.0 | 10.6 |
| Corn oil | 0 | + | + | + | + | + | + | 0 | 0 | 0 | + | + | + | + |
| Mineral oil | 0 | + | + | + | + | + | + | 0 | 0 | 0 | + | + | + | + |
| Kerosene | 0 | + | + | + | + | + | 0 | 0 | 0 | 0 | + | + | + | + |
| Gasoline | 0 | + | + | + | + | + | 0 | 0 | 0 | 0 | + | + | + | + |
| Cumene | | | | | | + | | | | | | | | |
| Xylene | | | | | | + | | | | | | | | |
| Butyl acetate | | | + | | | + | | | | | | | | |
| 2-methyl pentanone-4 | | 0 | | | | + | | | | | | | | |

0=No gel formation. +=Gel formation.

In the case of the ethyl/undecyl oxazoline copolymer a 2% solution of the copolymer in ethylene glycol was made up. A mixture of 10 cc. of this solution and 10 cc. of the nonpolar constituent were shaken until gel formation occurred. The procedure utilized with the ethyl/undecyl oxazoline copolymer was the same except that a 10% solution of copolymer in ethylene glycol was used.

EXAMPLE 20

Gels may also be prepared from a 95/5 methyl/undecyl oxazine copolymer in accordance with the procedure of Example 16. A mixture comprising 0.1 gram of copolymer dissolved in 0.50 cc. of ethanol, 10 ml. of water or ethylene glycol and 10 ml. of nonpolar constituent is shaken vigorously, with heating if necessary till gel formation occurs. Results are tabulated below.

| Organic component | Polar component | Gel formation |
|---|---|---|
| Mineral oil | Ethylene glycol | Yes. |
| Gasoline | do | Yes. |
| Carbon tetrachloride | do | Yes. |
| Chloroform | do | No. |
| Corn oil | Water | Yes. |
| Mineral oil | do | Yes. |
| Benzene | do | Yes. |
| N-butyl benzoate | do | Yes. |
| Carbon tetrachloride | do | Yes. |
| Ethylacetate | do | No. |

EXAMPLE 21

Gels may also be prepared in accordance with the procedure of Example 16 using propylene glycol or ethanol-amine as the polar constituent. The following gels were formed:

| Organic component | Polar component | Polymer |
|---|---|---|
| Mineral oil | Propylene glycol | 80/20 $C_2/C_{11}$ oxazoline copolymer. |
| Do | Ethanol-amine | 95/5 $C_2/C_{11}$ oxazoline copolymer. |

EXAMPLE 22

A gel wherein the nonpolar constituent is a low melting solid was prepared according to the following procedure: A mixture of 10 cc. ethylene glycol, 0.5 gram 95.9/4.1 $C_2/C_{17}$ oxazoline copolymer and 0.5 cc. water was heated to 60° C. Then 10 cc. of paraffin wax (M.P. 42°–60° C.) was added in small portions. The heated mixture was shaken vigorously until spontaneous gelation of the entire mixture occurred. A gel was also prepared with this copolymer by a similar procedure using A–C6 polyethylene wax (M.P. ca. 100° C.) as the non-polar constituent, ethylene glycol-water mixture as the polar constituent.

Various modifications will be apparent to one skilled in the art and it is not intended that this invention be limited to the details in the specific examples presented by way of illustration. Accordingly, the scope of the invention is limited only by the appended claims.

I claim:
1. A gel consisting essentially of a homogeneous mixture of
  (A) A non-polar constituent selected from the group consisting of organic liquids and organic solids having a melting point of no greater than 150° C.;
  (B) A polar constituent selected from the group consisting of water, ethylene glycol, propylene glycol, ethanolamine, and mixtures thereof; and
  (C) A polymer obtained by copolymerizing in the presence of a cationic catalyst monomeric compounds of the formula

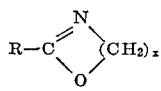

wherein R is a substituent selected from the group consisting of $CH_3-$, $C_2H_5-$, $C_nH_{2n+1}-\overset{O}{\underset{\|}{C}}O(CH_2)_m-$, $C_nH_{2n+1}-O\overset{O}{\underset{\|}{C}}-(CH_2)_m-$, $-O\overset{O}{\underset{\|}{C}}(CH_2)_m-$ and $HO(CH_2)_m-$, wherein $m$ is 0 to 6 inclusive and wherein the sum of the integers $m$ and $n$ is not greater than 6 and wherein $x$ is 2 or 3; with from 1 to 30 mol percent of $C_5$ to $C_{21}$ alkyl or alkenyl 2-substituted-$\Delta^2$-oxazoline or 5,6-dihydro-4H-1,3-oxazine, where there is present from 0.02 to 50 parts of component (C) per 100 parts of component (B) and wherein component (A) is from 20 to 85 weight percent of the gel.

2. A gel in accordance with claim 1 wherein there is present for 100 parts of polar constituent, from 1 to 20 parts of copolymer and from 100 to 400 parts of non-polar constituent.

3. A gel in accordance with claim 1 wherein the copolymer is represented by the structure

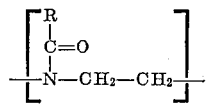

wherein R is ethyl in from 70 to 99% of the copolymer units and a $C_5$ to $C_{21}$ alkyl or alkenyl radical in from 30 to 1.0% of the copolymer units.

4. A gel in accordance with claim 1 wherein the copolymer is represented by the structure

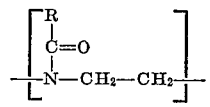

wherein R is methyl in from 70 to 97% of the copolymer units and a $C_5$ to $C_{21}$ alkyl or alkenyl radical in from 30 to 3% of the copolymer units.

5. A gel in accordance with claim 1 wherein the polar constituent is ethylene glycol and the nonpolar constituent is a $C_5$ to $C_{30}$ hydrocarbon selected from the group consisting of aliphatic, alicyclic and aromatic hydrocarbons, and mixtures thereof.

6. A gel in accordance with claim 5 wherein the hydrocarbon is selected from the group consisting of gasoline and kerosene.

7. A gel in accordance with claim 1 wherein the polar constituent is water and the nonpolar constituent is a fully halogenated aliphatic hydrocarbon.

8. A process for preparing gels which comprises homogeneously admixing
  (A) a non-polar organic liquid or solid having a melting point of no greater than 150° C.;
  (B) a polar liquid selected from the group consisting of water, ethylene glycol, propylene glycol, ethanolamine and mixtures thereof; and
  (C) a polymer obtained by copolymerizing in the presence of a cationic catalyst monomeric compounds of the formula

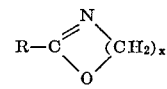

wherein R is a substituent selected from the group consisting of $CH_3-$, $C_2H_5-$, $C_nH_{2n+1}-\overset{O}{\underset{\|}{C}}O(CH_2)_m-$, $C_nH_{2n+1}-O\overset{O}{\underset{\|}{C}}-(CH_2)_m-$, $O\overset{O}{\underset{\|}{C}}(CH_2)_m-$ and $HO(CH_2)_m-$ wherein $m$ is 0 to 6 inclusive and wherein the sum of the integers $m$ and $n$ is not greater than 6 and wherein $x$ is 2 or 3; with from 1 to 30 mol percent of $C_5$ to $C_{21}$ alkyl or alkenyl 2-substituted-$\Delta^2$-oxazoline or 5,6-dihydro-4H-1,3-oxazine, wherein there is present from 0.02 to 50 parts of component (C) per 100 parts of component (B) and wherein component (A) is from 20 to 85 weight percent of the combined weight of components (A), (B) and (C).

9. A process in accordance with claim 8 wherein the homogeneous admixing is accomplished by adding the nonpolar constituent portionwise to a stirred, heated solution of the copolymer in the polar constituent.

References Cited

UNITED STATES PATENTS 2,620,345    12/1952    Dean _____ 252—316 X

OTHER REFERENCES

Litt et al., Belgian application 666,828, printed Nov. 3, 1965, pp. 1–7 and 23–27 relied upon.

Seeliger, German application 1,206,585, printed Dec. 9, 1965.

RICHARD D. LOVERING, Primary Examiner

U.S. Cl. X.R.

44—7; 99—123; 252—51.5, 171, 305